(12) United States Patent
Benghezal et al.

(10) Patent No.: US 6,588,269 B1
(45) Date of Patent: Jul. 8, 2003

(54) PIEZOELECTRIC DEVICE FOR MEASURING LIQUID LEVEL

(75) Inventors: Karim Benghezal, Chalons-en-Champagne (FR); Karim Ouenniche, Conde sur Marne (FR)

(73) Assignee: Marwal Systems, Chalons-en-Champagne (FR)

( * ) Notice: Subject to any disclaimer, the term of this patent is extended or adjusted under 35 U.S.C. 154(b) by 0 days.

(21) Appl. No.: 09/890,133

(22) PCT Filed: Jan. 25, 2000

(86) PCT No.: PCT/FR00/00160

§ 371 (c)(1),
(2), (4) Date: Sep. 26, 2001

(87) PCT Pub. No.: WO00/45137

PCT Pub. Date: Aug. 3, 2000

(30) Foreign Application Priority Data

Jan. 26, 1999 (FR) .............................................. 99 00818

(51) Int. Cl.⁷ ......................... G01F 23/00; G08B 21/00; G01S 15/00
(52) U.S. Cl. ...................... 73/290 V; 340/612; 181/124
(58) Field of Search ........................... 73/290 V, 1, 73, 73/64.53, 64.55; 181/124; 340/612

(56) References Cited

U.S. PATENT DOCUMENTS 2,753,542 A   7/1956   Rod et al.

FOREIGN PATENT DOCUMENTS

| DE | 41 26 063 | 2/1992 |
|---|---|---|
| EP | 0 138 541 | 4/1985 |
| WO | 91/02950 | 3/1991 |
| WO | 98/04889 | 2/1998 |

Primary Examiner—Daniel S. Larkin
Assistant Examiner—Katina Wilson
(74) Attorney, Agent, or Firm—Foley:Lardner

(57) ABSTRACT

The invention concerns a device for measuring liquid level, comprising a detection set (Si) including two piezoelectric cells (10, 12) associated with control means for transmitting ultrasonic waves respectively opposite a reference reflector (16), located at a known distance (D) from the associated cell, and from the top surface (14) of the liquid, and processing means for determining the level of liquid by operating on the respective propagation times of the ultrasounds emitted by each of the two cells (10, 12). The invention is characterised in that it comprises means for defining, after the device has been charged, an initialising phase (1100, 1100 bis) during which the control means control the piezoelectric cells (10, 12) such that the ratio between the excitation rate of the reference cell (12) and that of the level-measuring cell (10) is higher than the ratio between those same rates during the subsequent stabilised measuring phase (1300).

18 Claims, 15 Drawing Sheets

Figure 14:
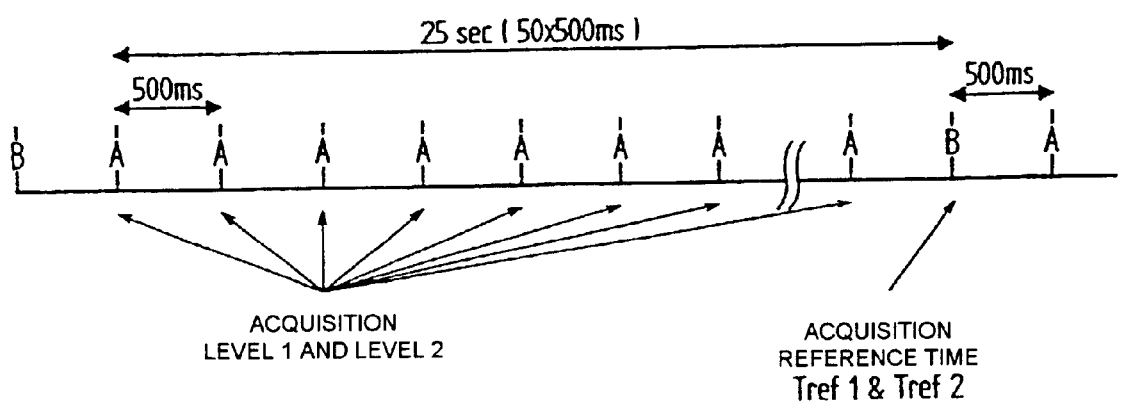

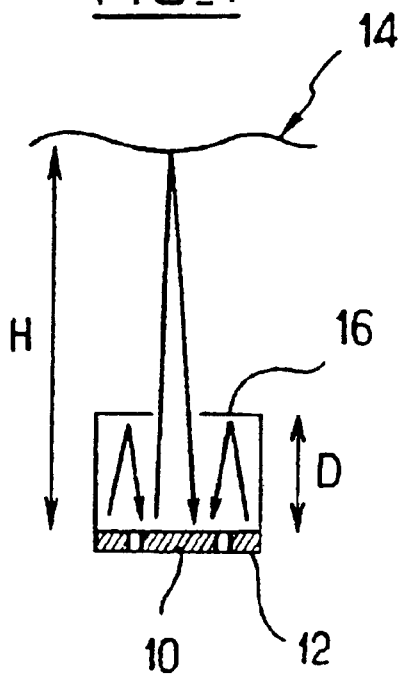
FIG_1
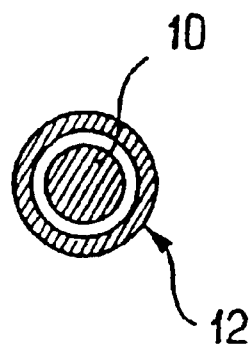
FIG_2
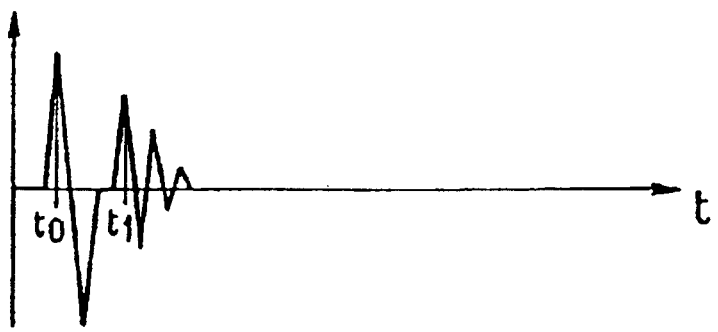
FIG_3a
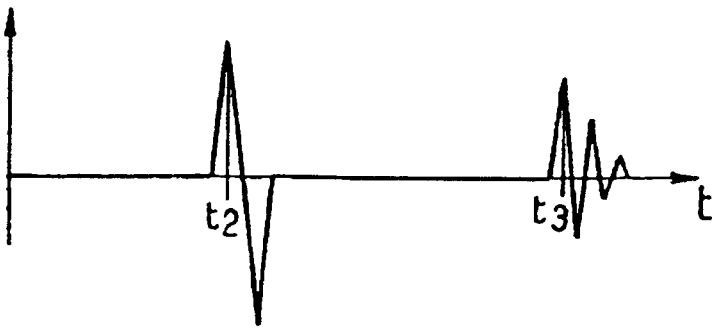
FIG_3b

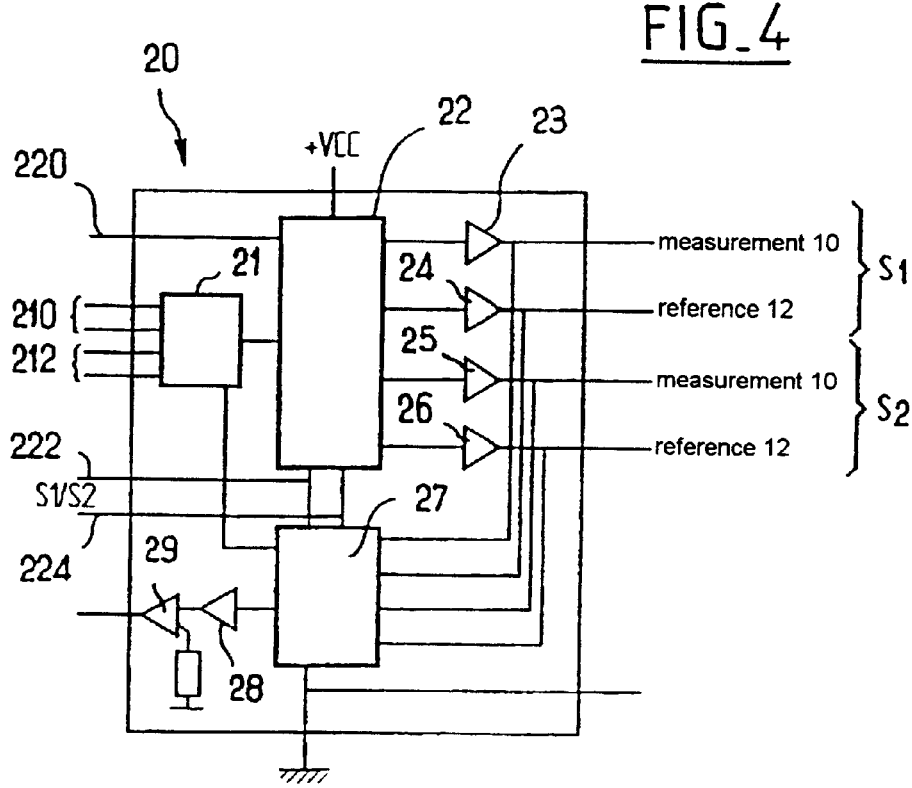
FIG_4
FIG_5
FIG_5a
FIG_5b
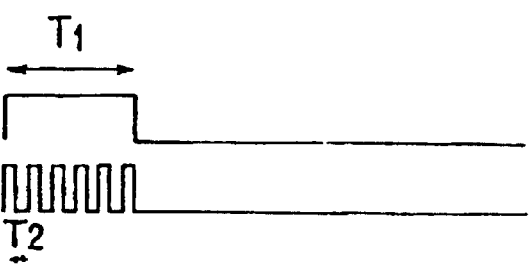
FIG_5c
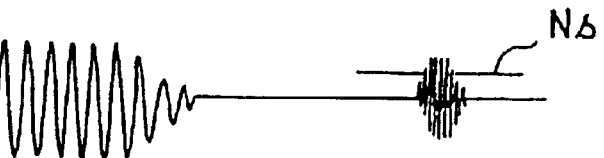
FIG_5d
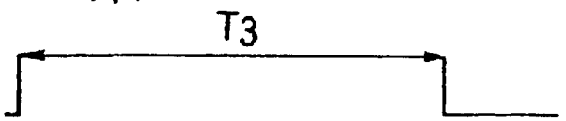
FIG_5e

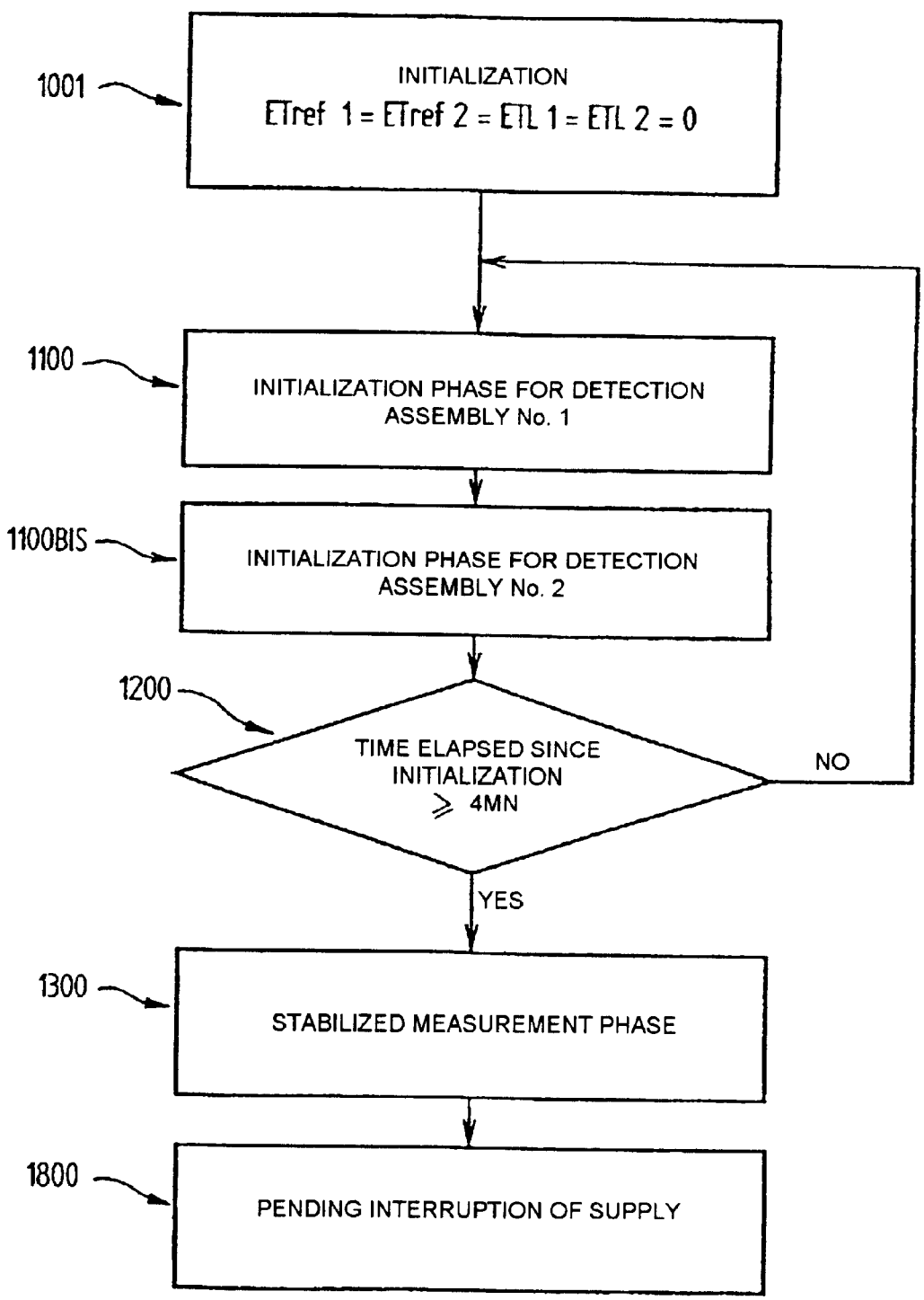

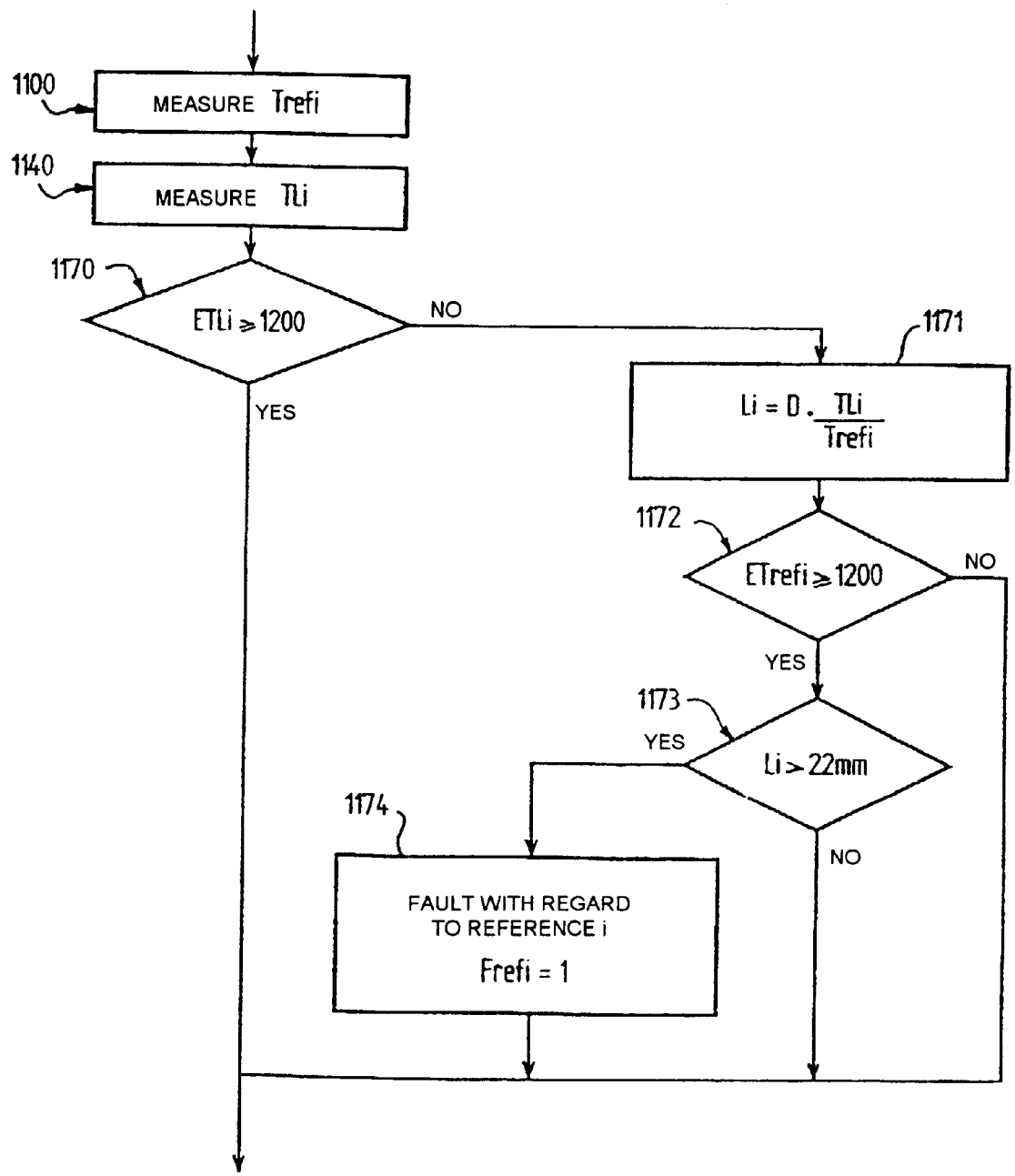

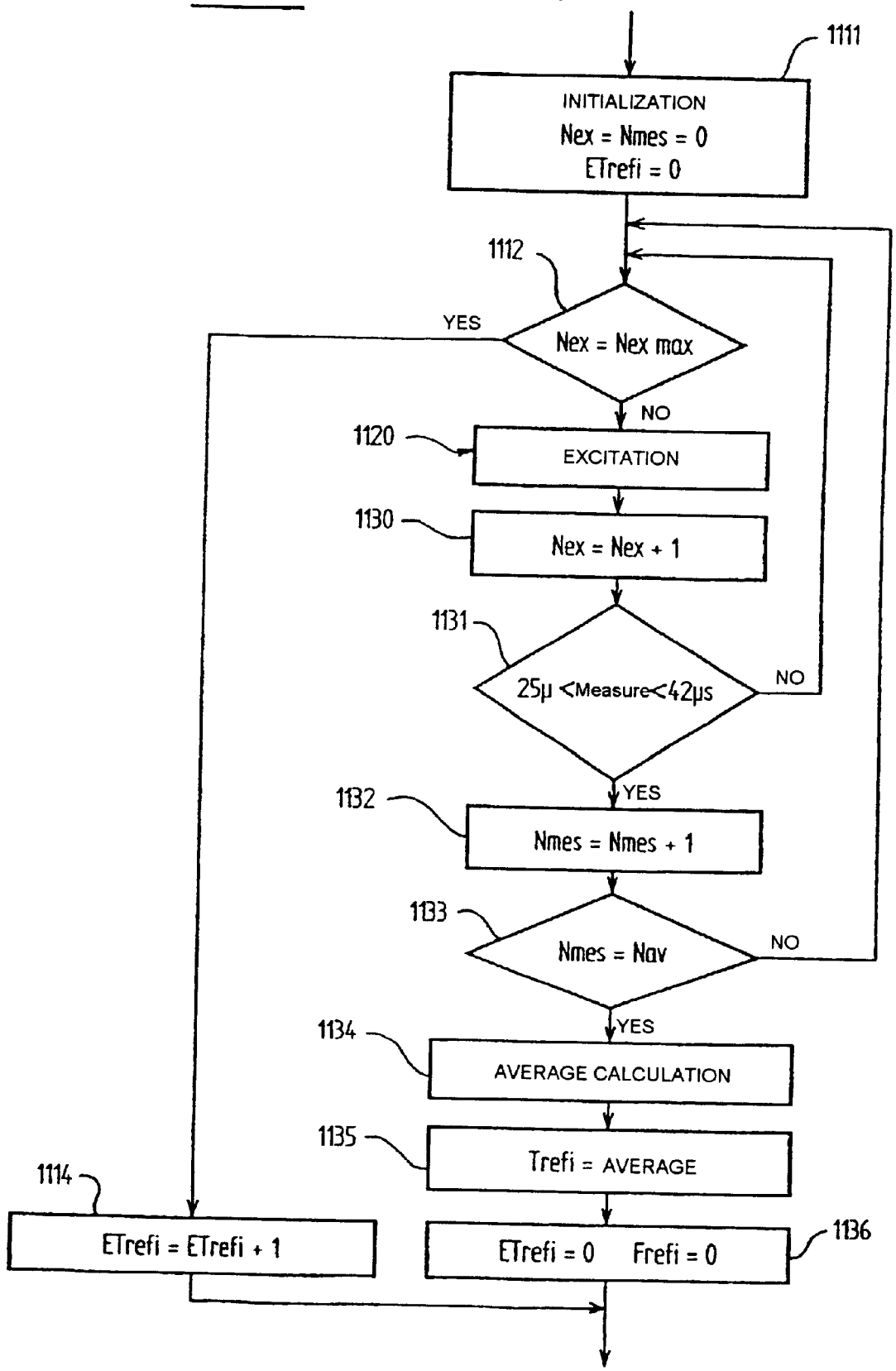
FIG_8  MEASURE Trefi -1110-

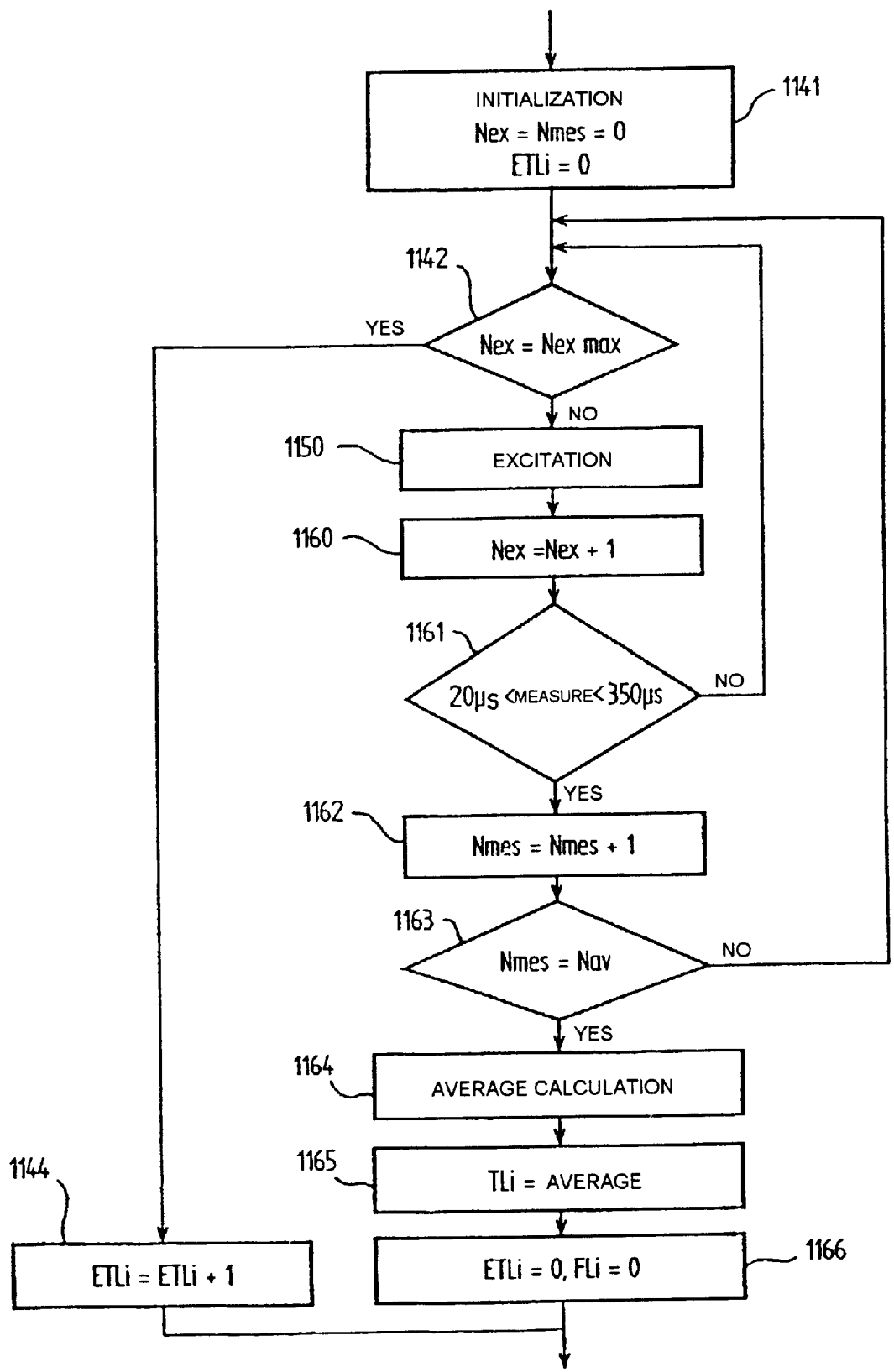
FIG_9  MEASURE TLi -1140-

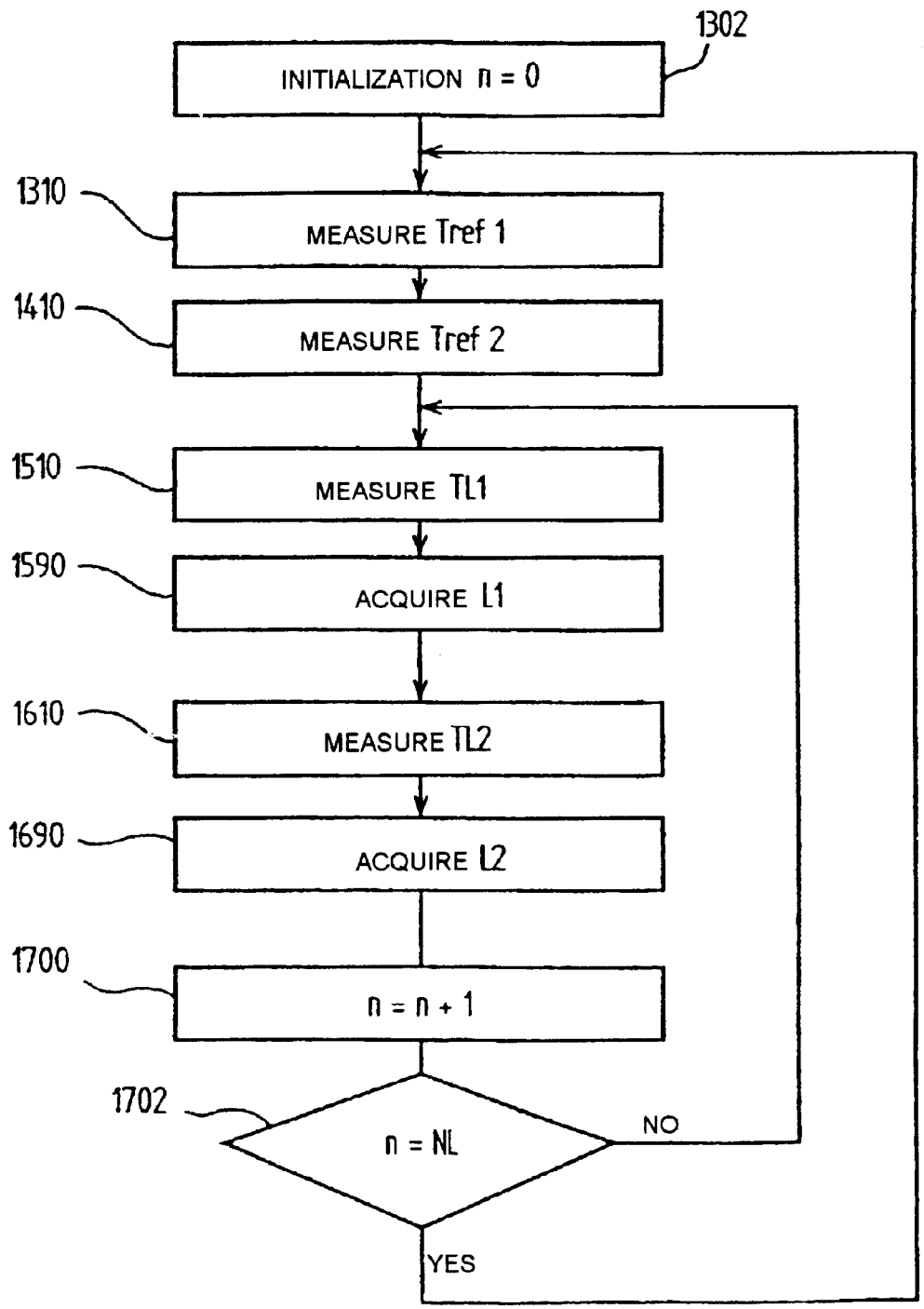
FIG_10  STABILIZED MEASUREMENT PHASE
-1300-

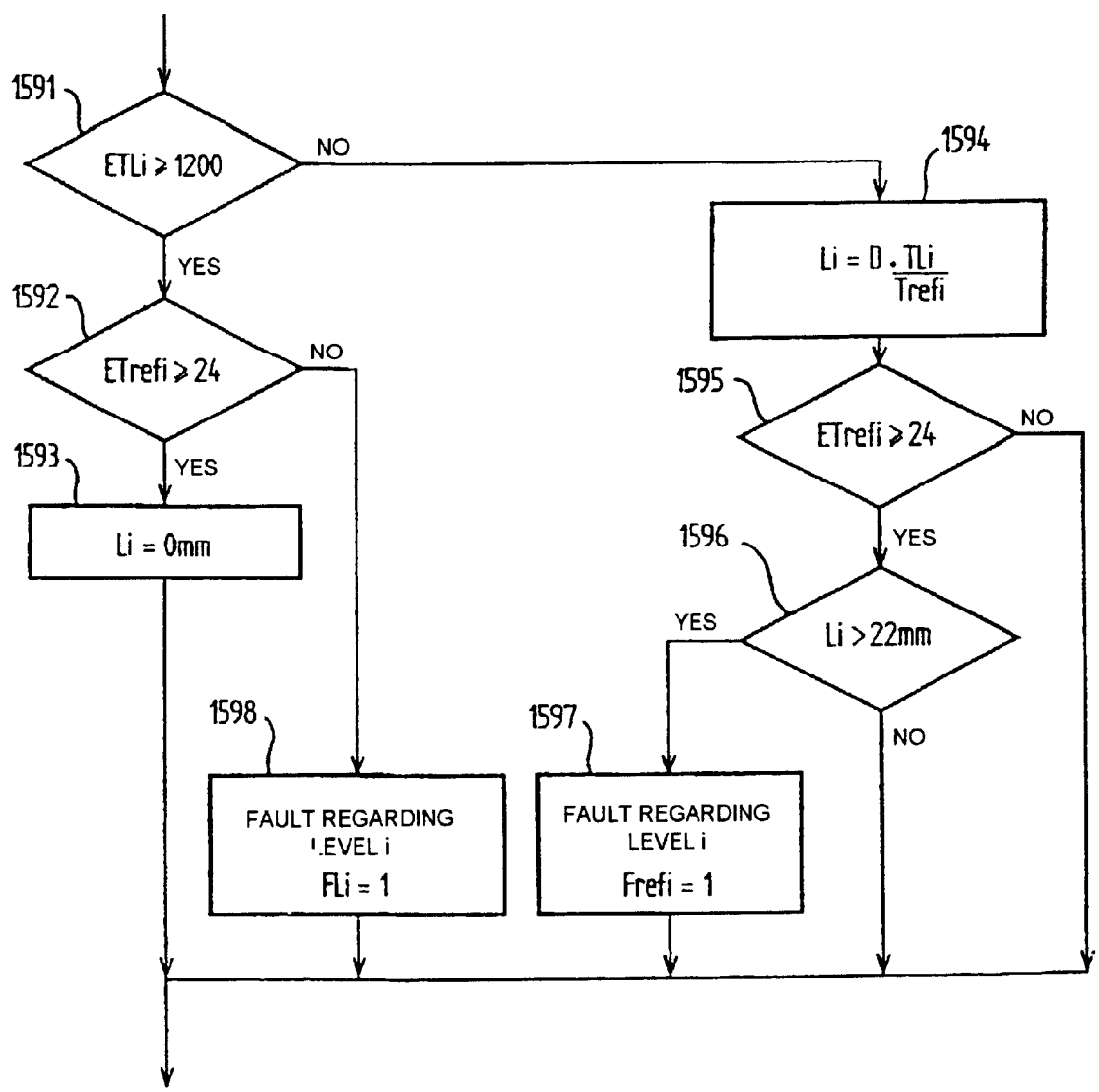
FIG. 11  ACQUIRE Li IN STABILIZED PHASE
-1590-

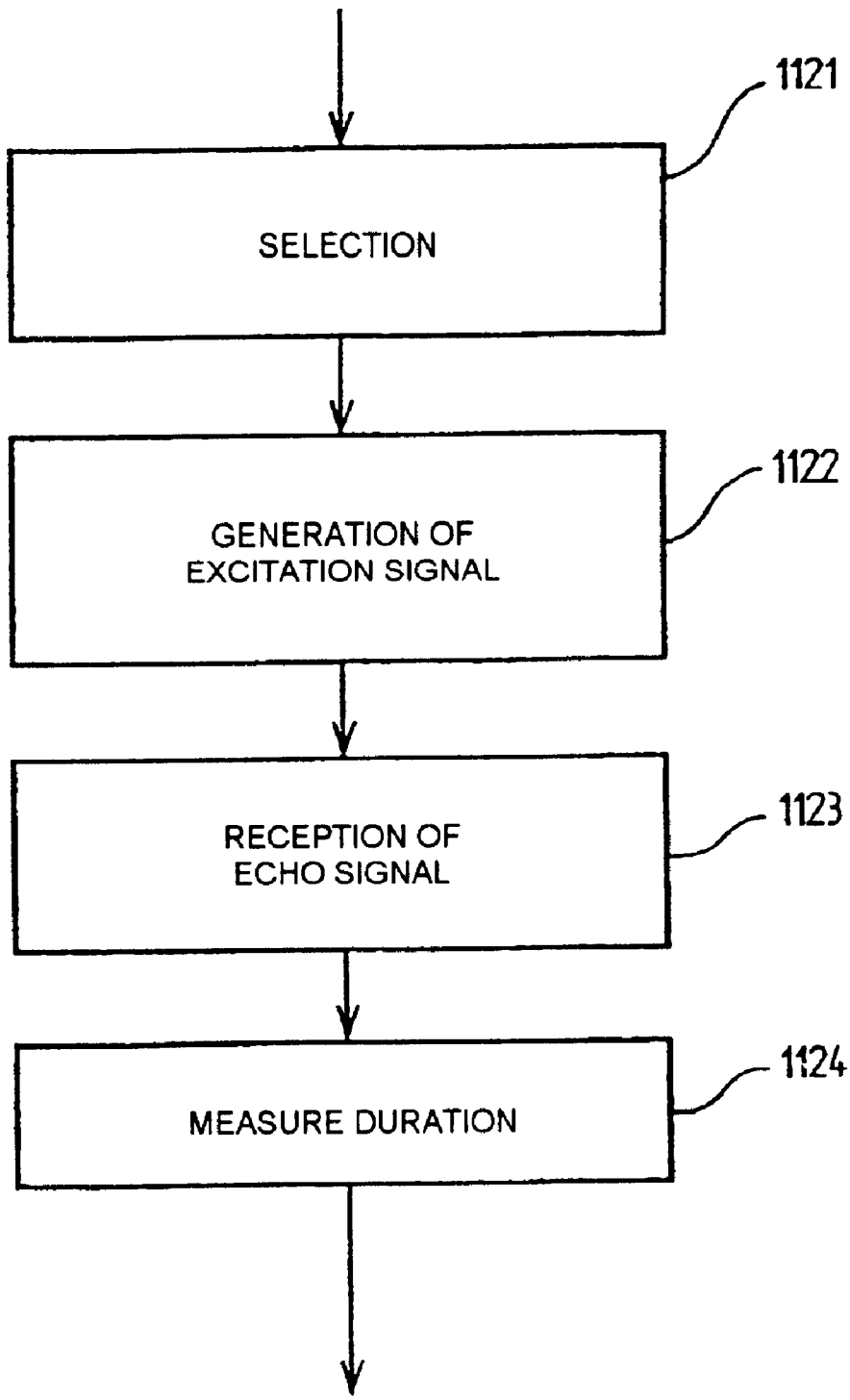

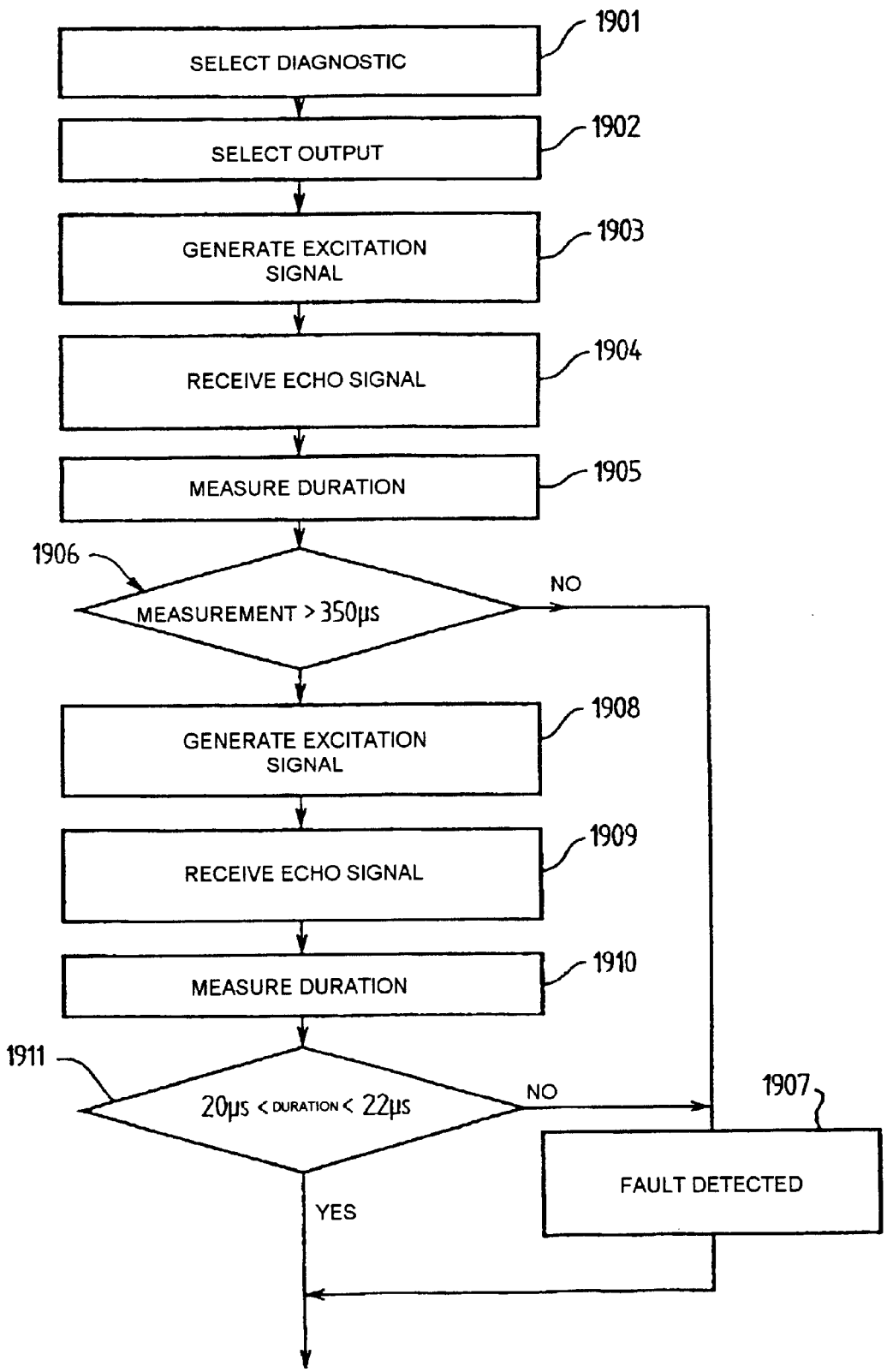
FIG_13   DIAGNOSTIC -1900-

STABILIZED PHASE
- 1300 -

ACQUISITION
LEVEL 1 AND LEVEL 2

ACQUISITION
REFERENCE TIME
Tref 1 & Tref 2

INITIALIZATION PHASE
- 1100 or 1100BIS -

C = ACQUISITION of Tref 1, reference time 1 and level 1

D = ACQUISITION of Tref 2, reference time 2 and level 2

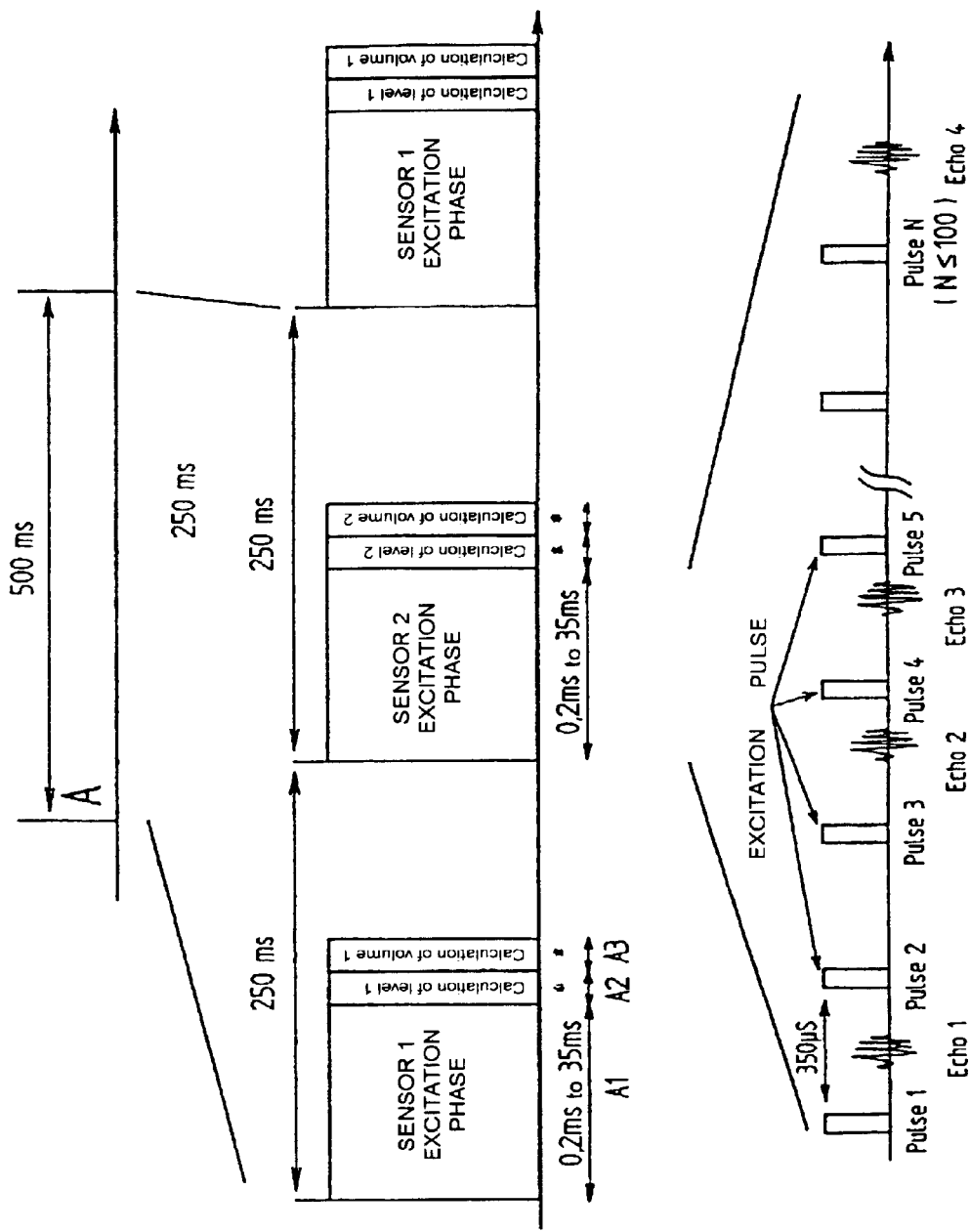

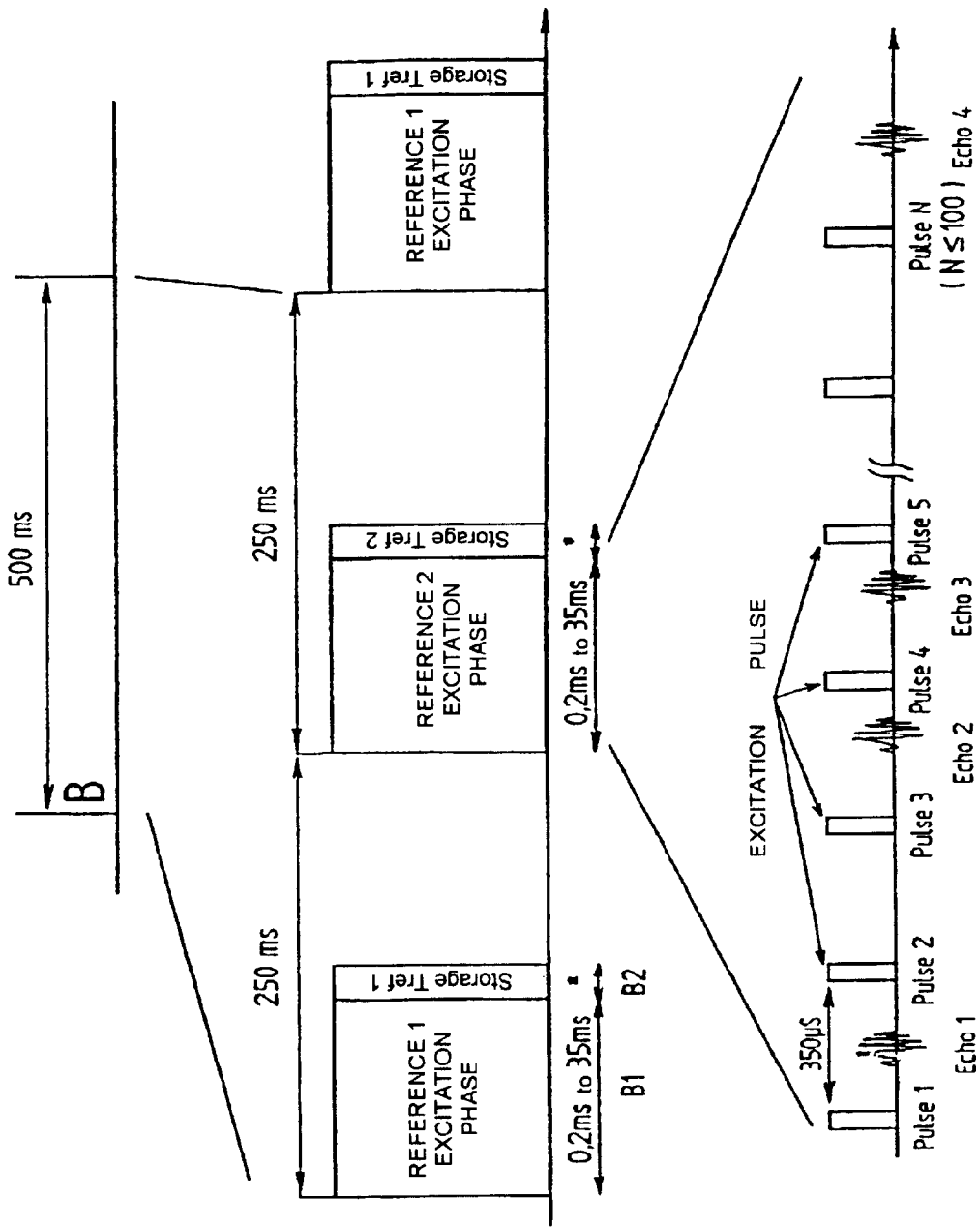

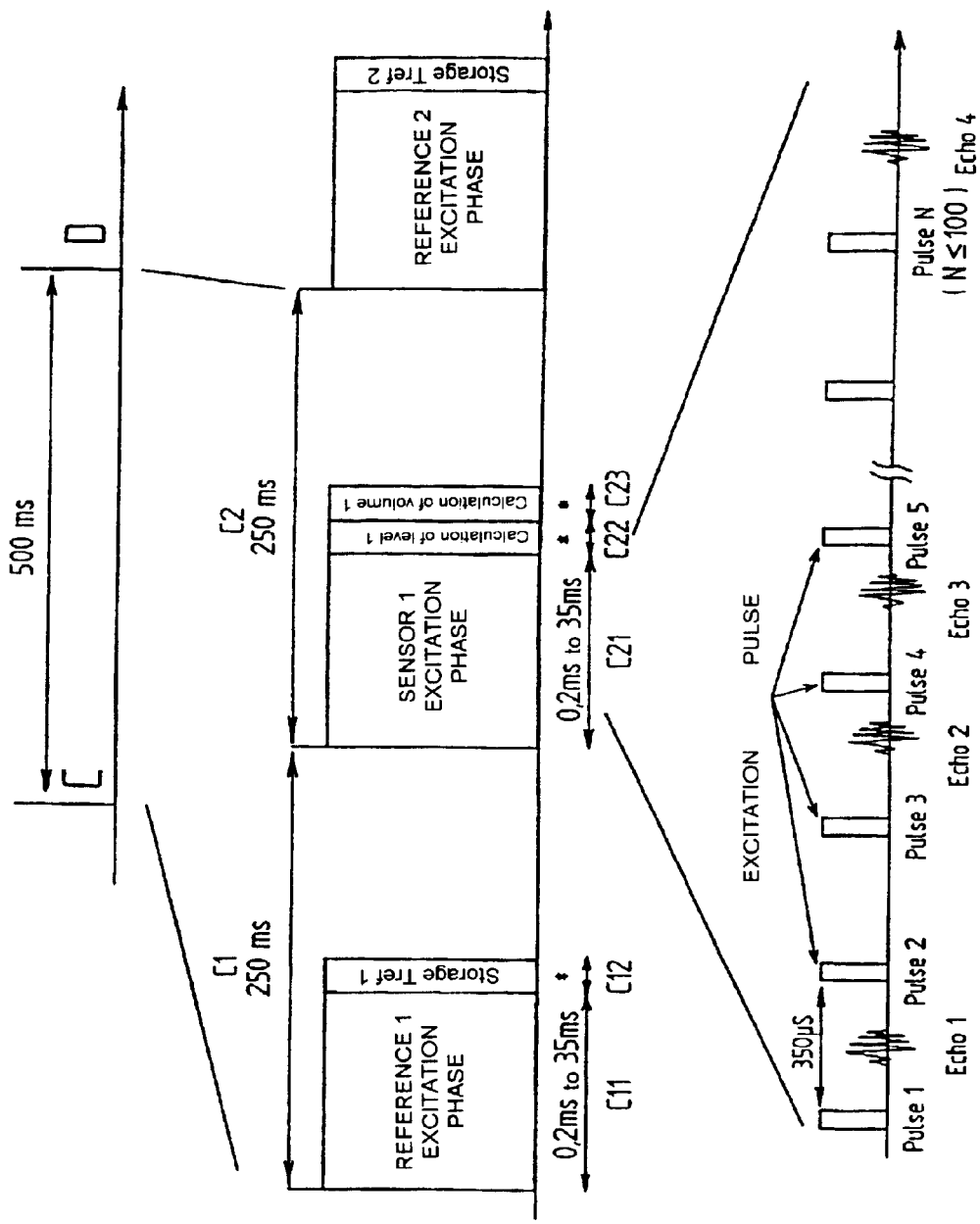
FIG. 18 DETAIL OF STEP C

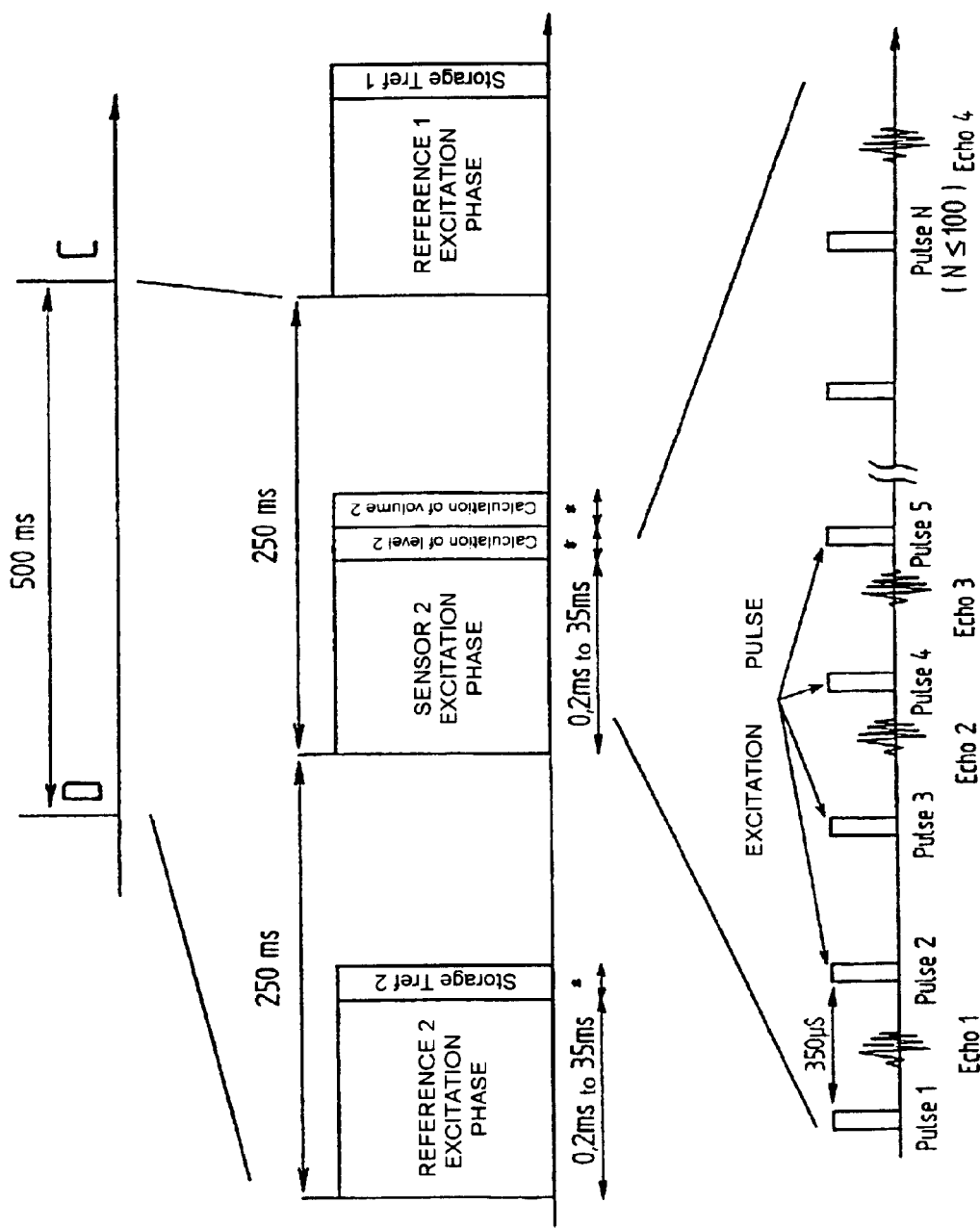

PIEZOELECTRIC DEVICE FOR MEASURING LIQUID LEVEL

The present invention relates to the field of devices for measuring liquid level based on piezoelectric means.

The present invention finds application in particular in the field of the measurement of fuel level/volume in a motor vehicle tank.

Various piezoelectric devices for measuring liquid level, in particular fuel level, have already been proposed.

Regarding this point, reference may be made for example to the documents FR-A-2751744, U.S. Pat. Nos. 5,095,748, 2,753,542, EP-A-0138541, WO-A-91/02950.

More precisely, the present invention relates to devices for measuring liquid level comprising at least one detection assembly (sometimes dubbed a probe or sensor) comprising at least two piezoelectric cells associated with control means for emitting ultrasound waves respectively opposite a reference reflector, situated a known distance from the associated cell on the one hand, and from the upper surface of the liquid on the other hand, and processing means able to determine the level of liquid by utilizing the respective times of propagation of the ultrasound waves emitted by each of these two cells.

The aim of the present invention is to improve the devices of the aforesaid type.

This aim is achieved according to the present invention by virtue of a device of this type comprising means able to define, after the device is switched on, an initialization phase during which the control means operate the piezoelectric cells in such a way that the ratio of the rate of excitation of the reference cell to that of the level measurement is greater than the ratio of these same rates during the subsequent measurement phase.

According to another advantageous characteristic of the present invention, the device furthermore comprises means able to define at least one diagnostic phase during which the piezoelectric cells are isolated from the outputs of the control means and the diagnostic means are sensitive to the signals present on the outputs of these control means.

Other characteristics, aims and advantages of the present invention will become apparent on reading the detailed description which follows and with regard to the appended drawings, given by way of nonlimiting examples and in which:

FIG. 1 represents a schematic view of the installation of the piezoelectric cells in accordance with the present invention, FIG. 2 represents a plan view of such piezoelectric cells, FIG. 3 represents at 3a the pulse of ultrasound waves emitted by a piezoelectric cell and the corresponding echo reflected from a reference and at 3b the excitation pulse emitted by a second cell and the echo arising from the reflection from the upper surface of the liquid, FIG. 4 represents a schematic view of control means associated with a microprocessor or micro-controller for operating the piezoelectric cells, FIG. 5 illustrates in the form of a schematic timing diagram the principle of measuring the time separating the emission of an excitation pulse and the reception of a corresponding echo, FIGS. 6 to 13 schematically represent in the form of flowcharts the preferred measurement procedure in accordance with the present invention, and FIGS. 14 to 19 schematically represent the sequential illustration of the various successive measurement steps effected within the framework of the present invention.

As illustrated in FIGS. 1 and 2 appended, the measurement device in accordance with the present invention comprises at least one detection assembly comprising two piezoelectric cells, 10, 12, for example ceramic cells, associated with control means.

When these cells 10, 12 are excited by an AC electrical signal alternating close to their resonant frequency, the cells vibrate and create a pressure wave.

Conversely, when the piezoelectric cells 10, 12 are mechanically stressed by a pressure wave, they generate an electrical signal as output.

More precisely still, within the framework of the invention, the two piezoelectric cells 10, 12 placed preferably level with the bottom of a tank are adapted so as to emit ultrasound waves respectively toward the upper surface of the liquid referenced 14 in FIG. 1 and toward a reference reflector 16, situated a known distance D from the associated cell 12.

The configuration of the cells 10, 12 can form the subject of numerous variant embodiments.

By way of nonlimiting example, as illustrated in FIG. 2, the cell 10 adapted to emit an ultrasound wave toward the surface 14 of the liquid can be formed of a central flat disk, whilst the cell 12 adapted to emit toward the reference 16 is formed of a concentric ring disposed on the outside of the central disk 10. In this case, preferably, as shown schematically in FIG. 1, the reference 16 is itself formed of a flat ring parallel to the cells 10, 12 and whose central opening is placed opposite the disk of the cell 10.

The present invention is not however limited to this particular disposition of cells. By way of nonlimiting example, it is thus possible to provide cells 10, 12 in the form of two juxtaposed half-disks.

It will also be noted that within the framework of the present invention, the two cells 10, 12 may be formed on separate piezoelectric patches, or on one and the same piezoelectric patch, the two cells 10, 12 being individualized on the patch, by respective separate metallizations, for the upper face of the patch, liquid side, in the form of a central inner disk for the cell 10 used for the height measurement and in the form of an outer annulus for the cell 12 used for the measurement of the reference time.

The measurement device in accordance with the present invention furthermore comprises processing means able to determine the height H of liquid in the tank by utilizing the respective times of propagation of the waves emitted by each of these two cells 10, 12.

Illustrated at 3a in FIG. 3 is, on the one hand, the excitation pulse for the reference cell 12 at a time t0 and the corresponding echo received at the instant t1 on the same cell 12 after reflection from the reference 16.

Likewise, illustrated in FIG. 3b is the excitation pulse for the measurement cell 10 at the instant t2 and the echo detected at the instant t3 on the same cell 10 after reflection from the upper surface 14 of the liquid.

Preferably, the aforesaid processing means are thus adapted for determining the height H of liquid, on the basis of the relation $H=D \cdot (t3-t2)/(t1-t0)$.

More precisely still, the present invention is particularly adapted for a measurement device comprising at least two assemblies of the type illustrated in FIGS. 1 and 2, each comprising a measurement cell 10 and a reference cell 12. Thus, the present invention finds application in particular in the measurement of fuel level in multi-reservoir tanks, by virtue of a piezoelectric assembly comprising a measurement cell 10 and a reference cell 12 in each reservoir of the tank.

The person skilled in the art is indeed aware that nowadays multi-reservoir fuel tanks for example are frequently made and usually comprise two reservoirs situated on either side of the rear axle of the vehicle and connected together at their upper part by a connection channel.

In the subsequent description, S1 and S2 will respectively refer to two such detection assemblies each comprising a measurement cell 10 and a reference cell 12 placed respectively in one of the reservoirs of a two-reservoir tank.

The general structure of control means 20 associated with such piezoelectric assemblies S1, S2 has been illustrated schematically in FIG. 4.

The control means 20 illustrated in FIG. 4, powered via a positive voltage +VCC, for example of 12 volts, essentially comprise a divider stage 21, a demultiplexer stage 22 and a multiplexer stage 27.

The divider stage 21 receives a clock signal on these inputs 210 and delivers on these outputs 212 a divided clock signal whose frequency is compatible with the processing of the signal.

The demultiplexer 22 comprises four outputs respectively connected by way of gates 23, 24, 25 and 26 to the measurement cell 10 and reference cell 12 of the first assembly S1 and to the measurement cell 10 and reference cell 12 of the second assembly S2.

The application of the excitation signals to the outputs of the demultiplexer 22 at the address of the cells 10, 12 of the two assemblies S1, S2 is supervised by a first input 220 of the demultiplexer 22 receiving an initialization signal, a second input 222 allowing a selection between the measurement cells 10 and the reference cells 12 and a third input 224 allowing a selection between the two assemblies S1/S2.

The same selection signals applied to the inputs 222, 224 of the demultiplexer are also applied to corresponding inputs of the multiplexer 27. The latter has four inputs connected respectively to the outputs of the gates 23, 24, 25 and 26.

The multiplexer 27 whose function is to detect the reception of echo signals on the cells 10, 12 has its output connected to the output of the control means by way of shaping gates 28, 29, for example threshold detection based.

As appropriate, the control means 20 illustrated in FIG. 4 may be supplemented, on the one hand, by an additional selection input allowing the selection of a diagnostic mode of operation and, on the other hand, with a set of additional gates disposed between the gates 23–26 and the piezoelectric cells so as to allow the piezoelectric cells to be isolated from the gates 23–26 and from the multiplexer 27 in diagnostic mode.

Shown schematically in FIG. 5 is a procedure for measuring the time separating the emission of an ultrasound wave at the output of a cell 10 or 12 and the detection of a corresponding echo.

Thus, illustrated in FIG. 5a is an initialization porch applied, for example by an external microprocessor, to the input 220 of the demultiplexer 22. By way of nonlimiting example, such an initialization pulse or initialization porch can possess an amplitude of the order of 5 volts and a duration T1 of the order of 1.5 $\mu$s to 6 $\mu$s.

As illustrated in FIG. 5b, during this initialization porch, the demultiplexer 22 generates on one of its outputs, destined for one of the measurement 10 or reference 12 cells of one of the assemblies S1/S2, depending on the state of the selection lines 222, 224, a string of excitation pulses corresponding for example to the pulses from the divider 21. By way of nonlimiting example, such pulses, of square shape, have a period T2 of the order of 500 ns.

Illustrated in FIG. 5c, on the left of the figure, is the ultrasound pressure wave generated by the vibration of the piezoelectric cell under the effect of the excitation signal illustrated in FIG. 5b, and on the right of the figure, is the corresponding echo detected on the same cell.

Also shown schematically in FIG. 5c is a threshold level Ns (utilized for example by the gate 29) with respect to which the signal detected on a piezoelectric cell is compared so as to discriminate between an echo signal received on such a cell (which is greater than Ns) and a noise signal (which is less than Ns).

Thus, when an echo signal greater than the threshold Ns is detected on a piezoelectric cell, the time T3 (see FIG. 5d) separating the initial instant of emission of the excitation and the appearance of the echo can be ascertained.

By counting the clock pulses emitted during this time T3 (see FIG. 5e), the outward and return time of the ultrasound wave after reflection from the level of the liquid 14 or the reference 16 can easily be determined.

The flowchart of the measurement procedure in accordance with the present invention will now be described with regard to FIGS. 6 to 13.

Within the framework of this description as well as in FIGS. 6 to 13, the following terminology is used:

TL1, TL2 or TLi designates the duration of the outward/return journey of an ultrasound wave emitted by a piezoelectric cell 10, reflected from the upper surface 14 of the liquid and detected by the same cell 10 on a sensor S1, S2 or Si;

Tref1, Tref2 or Trefi designates a time reference corresponding to the duration of the outward/return journey of an ultrasound wave emitted by the reference piezoelectric cell 12, reflected from the reference 16 and detected on the same cell 12 for the sensor S1, S2 or Si;

ETL1, ETL2 or ETLi denotes the number of consecutive invalid measurements for TL1, TL2 or TLi;

ETref1, ETref2 or ETrefi denotes the number of invalid and consecutive values for Tref1, Tref2 or Trefi;

L1, L2 or Li denotes the calculated liquid level in a tank reservoir No. 1, No. 2 or No. i;

Fref1, Fref2 or Frefi denotes a fault detection in respect of the measurement circuit (at the level of connecting lines, connector or piezoelectric cells) for one of the time references related to the sensor S1, S2 or Si;

FL1, FL2 or FLi denotes the detection of a fault in respect of the measurement circuit (at the level of a connection line, a connector or a piezoelectric cell) for one of the liquid levels in the reservoirs No. 1, No. 2 or i;

D denotes the distance separating the reference obstacle 16 and the piezoelectric cell 12 (typically D is of the order of 20 mm);

Nex denotes the number of excitation pulses emitted from the start of a measurement phase TLi or Trefi;

Nmes denotes the number of valid echoes from the start of a measurement phase TLi or Trefi;

Nexmax denotes the maximum number of excitation pulses permitted (typically Nexmax=99);

Nav denotes the number of time values acquired for producing the average necessary for storing Trefi or TLi (typically Nav=4);

n denotes an integer number necessary for the looped iterative procedure.

It will be noted henceforth that preferably the following parameters: Tref1, Tref2, TL1, TL2, L1, L2, Fref1, Fref2, FL1, FL2 are stored after having been calculated or measured and are saved should there be an interruption to the system supply.

Furthermore, preferably, the following parameters: ETref1, ETref2, ETL1, ETL2 are stored after having been calculated but do not necessarily require saving after a break in supply.

It will furthermore be noted that preferably when a fault is detected with regard to a time reference Fref1 or Fref2, the erroneous value obtained is preferably replaced with the highest value stored for Trefi, for example 42 ms.

Likewise, when a fault is detected with regard to the level for FL1 or FL2, predetermined values are preferably adopted for Li or TLi, for example Li=0 mm and TLi=20 μs.

Illustrated in FIG. 6 is the main flowchart 1000 of the procedure.

This main flowchart starts with an initialization step 1001 in the course of which the parameters ETref1, ETref2, ETL1 and ETL2 are set to zero.

This initialization step 1001 is followed by a subroutine 1100 for initializing measurement parameters in respect of the sensor S1 followed by a subroutine 1100bis for initializing measurement parameters in respect of the sensor S2. The execution of these two globally identical subroutines 1100, 1100bis, will be detailed subsequently with regard to FIG. 7.

At the end of each subroutine 1100bis, the supervisory means determine whether a predetermined time, for example of the order of 4 mn is reached after initialization, as shown schematically as step 1200 in FIG. 6. In the negative, the procedure is looped back by iterative repetition of a subroutine 1100 followed by 1100bis. Conversely, in the affirmative, the control means activate a subroutine 1300 corresponding to a stabilized-phase measurement procedure. The execution of the stabilized-phase measurement subroutine 1300 will be specified subsequently with regard to FIG. 10.

The main program 1000 illustrated in FIG. 6 comes to an end upon interruption of the supply as shown schematically in step 1800.

As indicated earlier, within the framework of the invention, in the course of the initialization phases 1100 and 1100bis, the control means operate the piezoelectric cells in such a way that the ratio of the rate of excitation of the reference cells 12 to that of the level measurement cells 10 is greater than the ratio of these same rates during the stabilized-phase subsequent measurement subroutine 1300.

Preferably, this ratio is of the order of 1 during the initialization phases 1100 and 1100bis and lies between 1/100 and 1/10 and very preferably of the order of 1/50 during the stabilized phase 1300.

Thus, preferably, within the framework of the invention, during the initialization phases 1100 and 1100bis, a Trefi measurement subroutine is implemented for a TLi measurement subroutine, while during the stabilized measurement phase 1300, a Trefi measurement subroutine is implemented for several TLi measurement subroutines, for example typically 50 TLi measurement subroutines.

The subroutine 1100 for one of the sensors i will now be described with regard to FIG. 7.

This subroutine 1100 starts with a subroutine 1110 for measuring Trefi itself followed by a subroutine 1140 for measuring TLi.

These two subroutines 1110 and 1140 will be specified subsequently with regard to FIGS. 8 and 9.

After the subroutine 1140, the supervisory means check in step 1170 whether the parameter ETLi is greater than or equal to a predetermined value for example 1200.

In the affirmative, the subroutine 1100 is terminated.

In the negative, the checking step 1170 is followed by a calculation step 1171 in the course of which the supervisory means calculate the height of liquid Li on the basis of the relation Li=D.TLi/Trefi.

Thus, on the completion of step 1171, a value indicative of the liquid level is available.

This calculation step 1171 is followed by a step 1172, in the course of which the supervisory means determine whether the parameter ETrefi is greater than a predetermined value, for example 1200.

In the negative, the subroutine 1100 is terminated.

Conversely, in the affirmative, the checking step 1172 is followed by a step 1173 in the course of which the supervisory means determine whether the parameter Li previously calculated is greater than a predetermined value, for example 22 mm.

In the negative, the subroutine 1100 is terminated.

In the affirmative, step 1173 is followed by a step 1174 in the course of which, a fault being detected for reference i, the parameter Frefi is set to 1.

The subroutine for measuring Trefi will now be described with regard to FIG. 8.

Subroutine 1110 starts with an initialization step 1111 in the course of which the parameters Nex, Nmes and ETrefi are set to zero.

In the subsequent step 1112, the supervisory means determine whether the parameter Nex is equal to Nexmax. It is recalled that Nexmax corresponds to a predetermined value, for example 99. The number Nexmax corresponds to the maximum number of pulses generated successively during an echo acquisition attempt (if no echo is detected following this string of pulses, the procedure is continued with regard to another parameter so as not to stall the system).

In the affirmative, step 1112 is followed by a step 1114 in the course of which the supervisory means establish ETrefi=ETrefi+1.

In case of negative at the output of step 1112, the latter is followed by an excitation subroutine 1120 which will be explained in greater detail subsequently with regard to FIG. 12.

This excitation subroutine is itself followed by a step 1130 in the course of which the supervisory means increment the value Nex with Nex=Nex+1.

After step 1130, the supervisory means implement a checking step 1131 in the course of which they determine whether the measurement time lies between two acceptable predetermined values, having regard to the distance D separating the reference reflector 16 and the cell 12, for example between 25 and 42 μs.

In the negative, step 1131 is followed by the reimplementing of step 1112.

Conversely, in the affirmative, the supervisory means implement a step 1132 of incrementing the parameter Nmes in the form of Nmes=Nmes+1.

Step 1132 is next followed by a checking step 1133 in the course of which the supervisory means determine whether Nmes=Nav. It is recalled that Nav corresponds to a number of time values obtained which is necessary to effect an average. Typically Nav=4.

In the negative, on completion of the interrogation of step 1133, the latter is followed by a repetition on step 1112.

Conversely, in the affirmative, on completion of the interrogation of step 1133, the latter is followed by a calculation of an average on the basis of the values obtained, in step 1134.

The latter is itself followed by a step 1135 in the course of which the value Trefi is established as being equal to the average obtained.

Step 1135 is itself followed by a step 1136 in the course of which the supervisory means establish ETrefi=0 and Frefi=0.

The subroutine 1140 for measuring TLi illustrated in FIG. 9 follows the same general flowchart as the subroutine 1110 described earlier with regard to FIG. 8.

For this reason, the subroutine for measuring TLi will not be described in detail.

It will simply be noted that the steps making up the subroutine 1140 for measuring TLi possesses numerical references incremented by 30 relative to their counterpart step illustrated in FIG. 8 and described earlier.

Furthermore, it will be noted that the subroutine 1140 for measuring TLi illustrated in FIG. 9 is distinguished from the subroutine 1110 for measuring Trefi illustrated in FIG. 8, by the following elements:

in the initialization step 1141, the parameter ETrefi of step 1111 must be replaced with the parameter ETLi;

in step 1161 it is necessary to adapt the time limits used for the comparison with the time span required in order to travel an outward/return journey with regard to the cell 10 after reflection from the liquid level 14, between the minimum level and the maximum level. Preferably, the lower time limit used in step 1161 is less than the counterpart time step used in step 1131 and the upper time limit used in step 1161 is bigger than the counterpart time limit used in step 1131. Typically, in step 1161 the measurement time is compared with the values 20 $\mu$s and 350 $\mu$s;

in step 1165 the parameter Trefi of step 1135 is replaced with TLi;

in step 1144 the supervisory means establish the relation ETLi=ETLi+1, and in step 1166 the supervisory means establish relations ETLi=0 and FLi=0.

The stabilized-phase measurement subroutine 1300 illustrated in FIG. 10 will now be described.

This stabilized-phase measurement subroutine 1300 starts with an initialization phase 1302 during which an iteration parameter n is set to zero.

The initialization step 1302 is followed by:

a subroutine 1310 for measuring Tref1, that is to say a reference time for the assembly S1, of the type illustrated in FIG. 8, a subroutine 1410 for measuring Tref2, that is to say the reference time for the assembly S2, also of the type illustrated in FIG. 8, a subroutine 1510 for measuring TL1, that is to say the measurement time for the assembly S1, of the type illustrated in FIG. 9, a subroutine 1590 for acquiring L1, that is to say the height of the liquid in reservoir No. 1 (this acquisition subroutine 1590 will be described later with regard to FIG. 11), a subroutine 1610 for measuring TL2, that is to say the measurement time for the assembly S2 in the reservoir No. 2, also of the type illustrated in FIG. 9, a subroutine 1690 for acquiring L2, that is to say the level of the liquid in reservoir No. 2, also of the type illustrated in FIG. 11, and an incrementation step 1700 in the course of which the supervisory means increment n to n+1.

After step 1700, the supervisory means implement an interrogation step 1702 in the course of which they detect whether n=NL.

As long as n is not equal to NL, the checking step 1702 is followed by an iterative repetition of the subroutines 1510, 1590, 1610, 1690 and step 1700.

On the other hand, when n is equal to NL, the checking step 1702 is followed by a looped iterative repetition from subroutines 1310 and 1410.

As indicated earlier, NL typically lies between 10 and 100, and is preferably of the order of 50. This value NL determines the number of liquid level acquisitions before the acquisition of a new time reference during the stabilized-phase measurement procedure 1300 and consequently determines the evolution of the ratio of the rate of excitation of the reference cells to the rate of excitation of the measurement cells between the stabilized phase 1300 and the initialization phase (where this ratio is preferably equal to 1).

The subroutine 1590 for acquiring Li in the course of the stabilized-phase measurement subroutine 1300 will now be described with regard to FIG. 11.

Subroutine 1590 starts with an interrogation step in the course of which the supervisory means investigate whether the number of consecutive invalid measurements ETLi is greater than a predetermined value, for example greater than or equal to 1200.

In the affirmative, step 1591 is followed by a step 1592 in the course of which the supervisory means investigate whether the number of consecutive invalid measurements Trefi is greater than or equal to a determined value, for example 24.

In the affirmative, step 1592 is followed by a step 1593 in the course of which the supervisory means force the value determined for the liquid level Li to a predetermined value, for example Li=0 mm.

In case of negative response on completion of step 1590, the supervisory means implement a step 1594 in the course of which they determine the height Li of the liquid on the basis of the relation L=D.TLi/Trefi.

This calculation step 1594 is followed by an interrogation step 1595 comparable to step 1592 in the course of which the supervisory means investigate whether the number of invalid values ETrefi is greater than or equal to a predetermined value, for example 24.

In the negative, the acquisition subroutine 1590 is terminated.

In the affirmative, step 1595 is followed by an interrogation step 1596 in the course of which the supervisory means investigate whether the parameter Li calculated is greater than a predetermined value, for example of the order of 22 mm.

In the negative, the acquisition subroutine 1590 is terminated. In the affirmative, step 1596 is followed by step 1597 in the course of which the supervisory means establish an error with regard to the reference i by setting the parameter Frefi to 1.

Furthermore, if the response to step 1592 is negative, the latter is followed by a step 1598 in the course of which the supervisory means having determined an error with regard to the level i, establish the parameter FLi at 1.

The excitation subroutine 1120 will now be described with regard to FIG. 12.

This subroutine is identical to that referenced 1150 in FIG. 9.

This excitation subroutine 1120 comprises an initial step 1121 of selecting the relevant assembly S1 or S2 followed by a step 1122 of generating an excitation signal for the piezoelectric cells, by a step 1123 of detecting the signals emitted by the piezoelectric cells following the reception of an echo and by a step 1124 of measuring the duration separating the emission of the excitation signal and the detection of the corresponding echo.

As indicated earlier, preferably, the means in accordance with the present invention implement at least cyclically a diagnostic subroutine during which the piezoelectric cells are isolated from the outputs of the demultiplexer 22 belonging to the control means and diagnostic means are sensitive to the signals present on these outputs so as to detect the proper operation of the assembly of the control means.

This diagnostic subroutine 1900 (illustrated in FIG. 13) starts with a step 1901 of selecting this subroutine.

Subsequently the diagnostic subroutine 1900 implements steps 1902 of selecting the relevant outputs theoretically corresponding to one of the two assemblies S1 or S2, a step 1903 during which the input 220 is validated by a determined duration (this signal corresponds to the porch in FIG. 5a) so that excitation pulses of the type represented in FIG. 5b are generated on one of the outputs of the demultiplexer 22. By way of nonlimiting example, the time T1 of emission of the excitation pulses in question can be of the order of 18 μs.

In the following step 1904, the supervisory means determine whether, on the expiry of a mask of a duration greater than the time of emission of the excitation pulses in step 1903, a signal is detected on one of the outputs of the demultiplexer 22. By way of nonlimiting example, the aforesaid mask has a duration of the order of 20 μs.

In the next step 1905, a measurement of the duration is effected. Then in the subsequent step 1906, the supervisory means determine whether the maximum duration necessary for an outward and return leg of the ultrasound wave for a maximum liquid level is reached (for example a duration of the order of 350 μs for a maximum height of 200 mm), without detection of an echo.

In case of negative response to this step 1906, that is to say if a signal is nevertheless detected after the expiry of the mask and within the maximum duration of possible outward/return time, the supervisory means determine in step 1907 that the circuit is faulty. Conversely, if the response to the question of step 1906 is positive, that is to say if no signal is detected between the expiry of the mask and of the maximum duration permitted, the diagnostic subroutine 1900 is prolonged by step 1908 which consists in applying a porch of the type illustrated in FIG. 5a to the input 220, of a duration T1 greater than the aforesaid mask, for example of the order of 21 μs. Then in step 1909, the validation of a signal detected on one of the outputs of the circuit is detected together with measurement of the duration in step 1910. Also in the interrogation step 1911, we determine whether a signal has been perceived at the output of the circuit during an interval lying between the expiry of the mask and a slightly greater time, for example between 20 and 22 μs.

If no signal is received in this interval detected in step 1911, the supervisory means determine that the circuit is faulty in step 1907.

In the converse case, the diagnostic subroutine 1900 is terminated.

The sequence of operation of the device in accordance with the present invention will now be specified with regard to FIGS. 14 to 19.

As indicated earlier, the procedure is divided into a stable measurement phase 1300 preceded by an initialization phase 1100, 1100bis.

As illustrated in FIG. 14, the stable initialization phase comprises strings of sequences A (or 1510–1690) for acquiring the levels 1 and 2, separated by a step B (or 1310–1410) of acquisition of the reference times Tref1 and Tref2.

By way of nonlimiting example, each sequence A and B can typically last 500 ms and provision may for example be made for 50 steps A for the acquisition of the levels 1 and 2, of a unitary duration of 500 ms, i.e. a total sequence of steps A of the order of 25 s, between two steps B of acquisition of the reference times.

Figure 15:
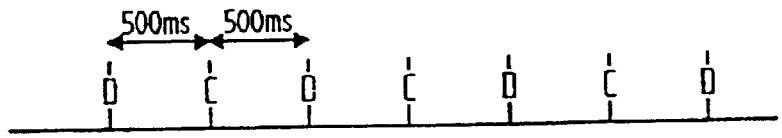

As illustrated in FIG. 15, preferably the initialization phase implemented upon the deploying of the supply, can be formed of an alternating succession of steps D and C of a unitary duration of the order of 500 ms corresponding respectively for step C to the acquisition of reference time 1 and of level 1 (in a first reservoir) and for step D to the acquisition of reference time 2 and to level 2 (in a second reservoir).

A step of type A has been detailed in FIG. 16.

Preferably, each step A is itself split into two equal subperiods, typically of 250 ms. During each of these subperiods, there is undertaken for a first time A1 the excitation of a sensor i, then during a time A2 the calculation of the corresponding level i and during a subsequent time A3 the calculation of the corresponding volume i by multiplying, if appropriate by integration, the measured level with the known cross section of the corresponding reservoir of the tank.

More precisely still, as may be seen at the foot of FIG. 16, each of the times A1 of a subperiod consists of a succession of emissions of excitation pulses and of detection of corresponding echoes.

The calculation of level i is effected only after detection of a requisite number of valid echoes Nav, typically four valid echoes. The level value stored corresponds to the average established on the basis of the four echoes detected.

The detail of a step B is illustrated in FIG. 17.

In comparable manner to step A, each step B is divided into two equal subperiods dedicated respectively to one of the assemblies i, each subperiod being itself divided, into a first time B1 of excitation of the corresponding reference cell 12 for a time typically lying between 0.2 ms and 35 ms followed by a time B2 of storage of the corresponding reference time Trefi.

Here again, each time B1 consists of a succession of emissions of excitation pulses for the cell 12 followed by the detection of the corresponding echo together with the establishment of the average on the basis of a requisite number of valid echoes, typically 4 valid echoes.

The detail of a step C is illustrated in FIG. 18.

Here again, each step C is divided into two subperiods, preferably of identical duration of the order of 250 ms. One of these subperiods is dedicated to the excitation of the reference cell i, whilst the second subperiod is dedicated to the excitation of the corresponding measurement cell i.

The first subperiod C1 comprises a first time C11, for example of a duration of 0.2 ms to 35 ms of excitation of the reference cell i followed by a time C12 of storage of Trefi.

The second subperiod C2 comprises a first time C21, for example of 0.2 ms to 35 ms of excitation of the measurement cell i followed by a time C22 of calculation of the corresponding level i and by a time C23 of calculation of the corresponding volume i. Here again, each first time C11 and C21 consists of a succession of emissions of excitation pulses, followed by a detection of echoes together with the establishment of an average on the basis of a predetermined number Nav (preferably four) of valid echoes.

The detail of a step D is illustrated in FIG. 19.

The latter step is identical to the aforesaid step C illustrated in FIG. 18 to this ready that it is applied to the reference and measurement cells of a detection element i+1.

Of course the present invention is not limited to the particular embodiment just described, but extends to all variants in accordance with the spirit thereof.

Described earlier was a measurement procedure applied to a system comprising two detection assemblies S1, S2 disposed respectively in the reservoirs of a two-reservoir tank. The person skilled in the art will however understand that the invention may be used for a single-reservoir system or else in a system comprising a number x of reservoirs greater than 2 and consequently comprising the same number x of probes Si.

What is claimed is:

1. A device for measuring liquid level, comprising at least one detection assembly (Si) comprising at least a piezoelectric cell adapted to serve as a reference cell and a piezoelectric cell adapted to serve as a level measurement cell, the cells being associated with control means for emitting ultrasound waves respectively opposite a reference reflector, situated a known distance (D) from the associated cell on the one hand, and from the upper surface of the liquid on the other hand, and processing means able to determine the level of liquid by utilizing the respective times of propagation of the ultrasound waves emitted by each of these two cells, further comprising a means to define, after the device is switched on, an initialization phase during which the control means operate the piezoelectric cells in such a way that the ratio of the rate of excitation of the reference cell to that of the level measurement cell is greater than the ratio of the rate of excitation of the reference cell to that of the level measurement cell during a stabilized subsequent measurement phase.

2. A device according to claim 1, wherein the ratio of the rates of excitation of the reference cell to that of the level measurement cell is of the order of 1 during the initialization phase and lies between 1/10 and 1/100 during the stabilized measurement phase.

3. A device according to claim 2, wherein the ratio of the rates of excitation of the reference cell to that of the level measurement cell is on the order of 1.50 during the stabilized measurement phase.

4. A device according to claim 1, comprising i detection assemblies each comprising two piezoelectric cells disposed respectively in the reservoirs of a multi-reservoir tank.

5. A device according to claim 1, comprising a second assembly (S2) comprising a piezoelectric cell adapted to serve as a reference cell and a piezoelectric cell adapted to serve as a level measurement cell, S1 and S2 being disposed respectively in a reservoir of a two-reservoir tank.

6. Device according to one of claims 1 to 5, characterized in that each detection assembly (S1, S2) comprises a central measurement piezoelectric cell (10) surrounded by an annular reference piezoelectric cell (12).

7. Device according to claim 1, characterized in that it comprises control means able to implement, after an initialization (1101), a procedure comprising:

a) at least one step (1100, 1100bis) for initializing at least one sensor (i) in the course of which the system acquires parameters, with a high ratio of the rate of excitation of the reference cells (12) to the rate of excitation of the measurement cells (10), b) a step (1200) of iteratively repeating the aforesaid step a) for a determined time, then c) a stabilized measurement step (1300).

8. Device according to claim 7, characterized in that step a) consists in acquiring the parameters successively for i detection assemblies (Si).

9. Device according to claim 7, characterized in that during step a), the supervisory means proceed successively for each of the detection assemblies (i) to alternating steps (C, D) of excitation of the reference piezoelectric cell (12) and of the measurement piezoelectric cell (10).

10. Device according to claim 7, characterized in that during step c) of stabilized measurement (1300), the supervisory means define a succession of excitations (A) of the measurement cells (10), alternately for the (I) sensors, between two steps (B) of excitation of the corresponding reference cells.

11. A device according to claim 7, wherein step a) comprises acquiring the parameters successively for i detection assemblies (Si).

12. A device according to claim 1, wherein each measurement is made by averaging a determined number (Nay) of acquired valid measurement times.

13. A device according to claim 12, wherein each measurement is made by averaging four successive valid measurement times.

14. Device according to claim 1, characterized in that it furthermore comprises means able to define at least sequentially a diagnostic subroutine (1900) during which the piezoelectric cells (10, 12) are isolated from the outputs of the control means and the diagnostic means are sensitive to the signals present on the outputs of these control means.

15. Device according to claim 14, characterized in that the diagnostic subroutine (1900) comprises an excitation signal emission phase (1903) lasting a duration less than that of a temporal mask and the detection (1906) of the absence of a signal at the output of the control means for a maximum measurement duration.

16. Device according to claim 14, characterized in that the diagnostic subroutine (1900) of emission an excitation signal lasting a duration greater than that of a temporal mask and the detection (1911) of a signal at the output of the control means upon the expiry of this temporal mask.

17. A device according to claim 1, wherein the device is for measuring the fuel level in a motor vehicle tank.

18. A device for measuring liquid level, comprising at least one detection assembly (Si) comprising at least a piezoelectric cell adapted to serve as a reference cell and a piezoelectric cell adapted to serve as a level measurement cell, the cells being associated with a controller for emitting ultrasound waves respectively opposite a reference reflector, situated a known distance (D) from the associated cell on the one hand, and from the upper surface of the liquid on the other hand, and a processor adapted to determine the level of liquid by utilizing the respective times of propagation of the ultrasound waves emitted by each of these two cells, further comprising an algorithm to define, after the device is switched on, an initialization phase during which the controller operates the piezoelectric cells in such a way that the ratio of the rate of excitation of the reference cell to that of the level measurement cell is greater than the ratio of the rate of excitation of the reference cell to that of the level measurement cell during a stabilized subsequent measurement phase.

* * * * *